United States Patent [19]

Goto et al.

[11] Patent Number: 4,895,672
[45] Date of Patent: Jan. 23, 1990

[54] TOLAN COMPOUND AND LIQUID CRYSTAL COMPOSITION CONTAINING THE SAME

[75] Inventors: Yasuyuki Goto; Toshiharu Suzuki, both of Ichiharashi, Japan

[73] Assignee: Chisso Corporation, Japan

[21] Appl. No.: 233,048

[22] Filed: Aug. 17, 1988

[30] Foreign Application Priority Data

Sep. 25, 1987 [JP] Japan .................. 62-240499

[51] Int. Cl.$^4$ .................. C09K 19/30; C07C 43/21; C07C 43/215; C07C 43/225
[52] U.S. Cl. .................. 252/299.63; 252/299.5; 350/350 R; 568/631; 568/647
[58] Field of Search ............ 252/299.5, 299.6, 299.63; 350/350 R; 568/631, 646, 647

[56] References Cited

U.S. PATENT DOCUMENTS

| | | | |
|---|---|---|---|
| 4,637,897 | 1/1987 | Kelly | 252/299.63 |
| 4,713,468 | 12/1987 | Takatsu et al. | 252/299.63 |
| 4,778,620 | 10/1988 | Goto et al. | 252/299.63 |
| 4,816,180 | 3/1989 | Goto et al. | 252/299.63 |

FOREIGN PATENT DOCUMENTS

| | | |
|---|---|---|
| 276067 | 7/1988 | European Pat. Off. . |
| 61-197543 | 9/1986 | Japan . |
| 88/02130 | 3/1988 | PCT Int'l Appl. . |

Primary Examiner—John F. Terapane
Assistant Examiner—J. E. Thomas
Attorney, Agent, or Firm—Leydig, Voit & Mayer

[57] ABSTRACT

A liquid crystal substance having a low viscosity and good compatibility thereof with existing liquid crystals at low temperatures in addition to a large optical anisotropy value and a high clearing point and a liquid crystal composition containing the substance are provided, which substance is a 4-(trans-4-alkylcyclohexylmethyloxy)-4'-substituted-tolan expressed by the formula

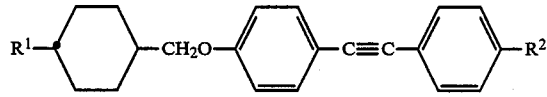

wherein $R^1$ is 1–10C alkyl and $R^2$ is 1–10C alkyl or F or Cl.

5 Claims, No Drawings

TOLAN COMPOUND AND LIQUID CRYSTAL COMPOSITION CONTAINING THE SAME

BACKGROUND OF THE INVENTION

1. Field of the Invention

This invention relates to a tolan derivative as a novel compound and a liquid crystal mixture containing the same.

2. Description of the Related Art

Display elements having applied liquid crystals utilize various electrooptical effects of liquid crystal substances, and the display mode thereof includes various modes such as twisted nematic mode, dynamic scattering mode, guest-host mode, DAP (Deformation of Vertically Aligned Phases) mode etc. The properties required for liquid crystal substances used for these modes vary depending on the respective modes, but it is required in common therewith that the liquid crystal substances exhibit liquid crystal phases within a temperature range as broad as possible and are stable to moisture, heat, air, etc. and also to light, electricity, etc. At present, however, no single substance which satisfies all of the above requirements exist, and currently that several kinds of liquid crystal compounds have been mixed or several kinds of liquid crystal compounds have been mixed with compounds similar to liquid crystal compounds and the resulting liquid crystal mixtures have been used.

As to examples of tolan derivatives used as a component of liquid crystal materials, compounds expressed by the following formulas (1) – (4) are respectively disclosed in (1) French patent application laid-open No. 2,141,438, (2) Japanese patent application laid-open No. Sho 60-152427/1985, (3) Japanese patent application laid-open No. Sho 61-260031/1986 and (4) Japanese patent application laid-open No. Sho 60-204731/1985:

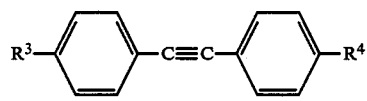
(1)

wherein $R^3$ and $R^4$ each represent an alkyl group or an alkoxy group,

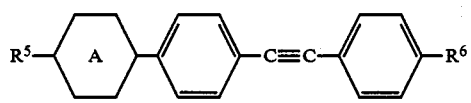
(2)

wherein

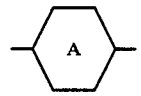

represents

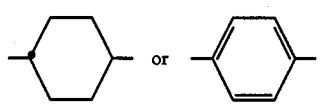

and $R^5$ and $R^6$ each represent a linear alkyl group,

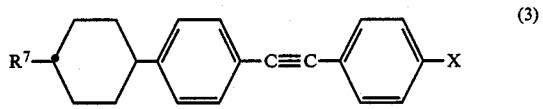
(3)

wherein $R^7$ represents a linear alkyl group and X represents a halogen atom, and

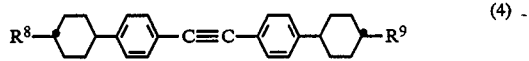
(4)

wherein $R^8$ and $R^9$ each represent a linear alkyl group.

These tolan compounds are liquid crystal materials which exhibit a large optical anisotropy value (hereinafter referred to Δn) and a high clearing point.

SUMMARY OF THE INVENTION

The object of the present invention is to provide a liquid crystal substance having a low viscosity and a good compatibility thereof with existing liquid crystals at low temperatures in addition to the abovementioned specific features.

The present invention resides in a 4-(trans-4-alkylcyclohexylmethyloxy)-4'-substituted-tolan expressed by the formula

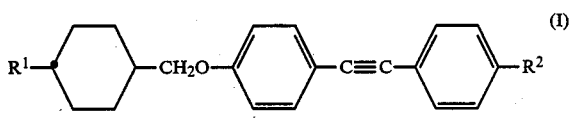
(I)

wherein $R^1$ represents an alkyl group of 1 to 10 carbon atoms and $R^2$ represents an alkyl group of 1 to 10 carbon atoms or a halogen atom of F or Cl, and a liquid crystal mixture containing the abovementioned compound.

DETAILED DESCRIPTION OF PREFERRED EMBODIMENTS

The compound of the formula (I) of the present invention may be prepared for example according to the following route:

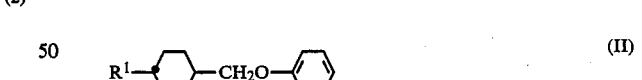
(II)

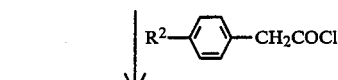

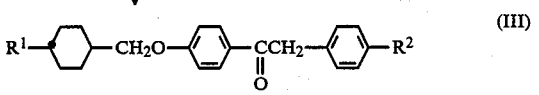
(III)

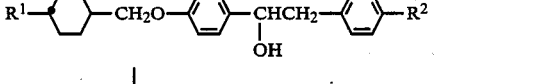
(IV)

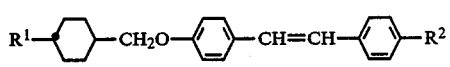

(V)

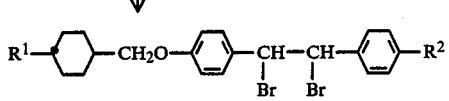

(VI)

↓

(I)

wherein $R^1$ and $R^2$ are as defined above.

A substituted benzene expressed by the formula (II) is first reacted with a 4-substituted-phenylacetyl chloride and anhydrous aluminum chloride in $CS_2$ to obtain a ketone derivative of the formula (III), which is then reacted with a reducing agent such as lithium aluminum hydride in an anhydrous solvent such as ether, tetrahydrofuran etc. to obtain an alcohol derivative of the formula (IV), which is then subjected to a dehydration reaction in the presence of a catalyst mentioned later in an inert organic solvent at a reflux temperature under atmospheric pressure, to obtain an ethylene derivative of the formula (V). As the inert organic solvent, benzene, toluene, chloroform, carbon tetrachloride, methylene chloride, etc. are suitable, and as the catalyst, Lewis acids such as aluminum chloride, tin tetrachloride, titanium tetrachloride, etc., mineral acids such as sulfuric acid, phosphoric acid, etc., toluenesulfonic acid, etc. are usable.

Successively, bromine is subjected to addition reaction to the ethylene derivative of the formula (V) in a solvent such as methylene chloride, ethylene chloride, carbon tetrachloride, etc. to obtain a compound (VI), which is then reacted with potassium tertiary-butoxide in a solvent of tetrahydrofuran, followed by subjecting the compound(VI) to a series of purification operations such as extraction, washing, recrystallization, etc. to obtain the objective compound of the formula (I). The reactions at the respective steps of these are known, but the overall preparations are a novel preparation process.

The substituted benzene of the formula (II) as the starting material is obtained by applying a known reaction to a readily commercially available raw material.

The 4-(trans-4-alkylcyclohexylmethyloxy)-4'-substituted-tolan of the present invention has specific features of (i) a large Δn, (ii) a low viscosity for a compound having a three-ring structure, and (iii) a high clearing point and a broad mesomorphic range.

Among the compounds of the present invention, those of the formula (I) wherein $R^1$ is ethyl group, propyl group, butyl group or pentyl group are preferred, and those of the formula (I) wherein $R^2$ is ethyl group, propyl group, butyl group, pentyl group, methoxy group, ethoxy group, propoxy group, butoxy group or pentyloxy group are preferred. As in the case of these compounds, compounds having no polar substituent at the end thereof are used as a liquid crystal material having a small dielectric anisotropy value and a large Δn. Examples of preferred compounds of the present invention are as follows:

4-(trans-4-ethylcyclohexylmethyloxy)-4'-ethyltolan,
4-(trans-4-propylcyclohexylmethyloxy)-4'-ethyltolan,
4-(trans-4-butylcyclohexylmethyloxy)-4'-ethyltolan,
4-(trans-4-pentylcyclohexylmethyloxy)-4'-ethyltolan,
4-(trans-4-ethylcyclohexylmethyloxy)-4'-propyltolan,
4-(trans-4-propylcyclohexylmethyloxy)-4'-propyltolan,
4-(trans-4-butylcyclohexylmethyloxy)-4'-propyltolan,
4-(trans-4-pentylcyclohexylmethyloxy)-4'-propyltolan,
4-(trans-4-ethylcyclohexylmethyloxy)-4'-butyltolan,
4-(trans-4-propylcyclohexylmethyloxy)-4'-butyltolan,
4-(trans-4-butylcyclohexylmethyloxy)-4'-butyltolan,
4-(trans-4-pentylcyclohexylmethyloxy)-4'-butyltolan,
4-(trans-4-ethylcyclohexylmethyloxy)-4'-pentyltolan,
4-(trans-4-propylcyclohexylmethyloxy)-4'-pentyltolan,
4-(trans-4-butylcyclohexylmethyloxy)-4'-pentyltolan,
4-(trans-4-pentylcyclohexylmethyloxy)-4'-pentyltolan,
4-(trans-4-ethylcyclohexylmethyloxy)-4'-methoxytolan,
4-(trans-4-propylcyclohexylmethyloxy)-4'-methoxytolan,
4-(trans-4-butylcyclohexylmethyloxy)-4'-methoxytolan,
4-(trans-4-pentylcyclohexylmethyloxy)-4'-methoxytolan,
4-(trans-4-ethylcyclohexylmethyloxy)-4'-ethoxytolan,
4-(trans-4-propylcyclohexylmethyloxy)-4'-ethoxytolan,
4-(trans-4-butylcyclohexylmethyloxy)-4'-ethoxytolan,
4-(trans-4-pentylcyclohexylmethyloxy)-4'-ethoxytolan,
4-(trans-4-ethylcyclohexylmethyloxy)-4'-propoxytolan,
4-(trans-4-propylcyclohexylmethyloxy)-4'-propoxytolan,
4-(trans-4-butylcyclohexylmethyloxy)-4'-propoxytolan,
4-(trans-4-pentylcyclohexylmethyloxy)-4'-propoxytolan,
4-(trans-4-ethylcyclohexylmethyloxy)-4'-butoxytolan,
4-(trans-4-propylcyclohexylmethyloxy)-4'-butoxytolan,
4-(trans-4-butylcyclohexylmethyloxy)-4'-butoxytolan,
4-(trans-4-pentylcyclohexylmethyloxy)-4'-butoxytolan,
4-(trans-4-ethylcyclohexylmethyloxy)-4'-pentyloxytolan,
4-(trans-4-propylcyclohexylmethyloxy)-4'-pentyloxytolan,
4-(trans-4-butylcyclohexylmethyloxy)-4'-pentyloxytolan,
4-(trans-4-pentylcyclohexylmethyloxy)-4'-pentyloxytolan, etc.

Further, compounds of the formula (I) wherein $R^2$ represents a halogen atom are used as a liquid crystal material having a relatively large dielectric anisotropy value and a large Δn.

Examples thereof are as follows:
4-(trans-4-ethylcyclohexylmethyloxy)-4'-fluorotolan,
4-(trans-4-propylcyclohexylmethyloxy)-4'-fluorotolan,
4-(trans-4-butylcyclohexylmethyloxy)-4'-fluorotolan,
4-(trans-4-pentylcyclohexylmethyloxy)-4'-fluorotolan,
4-(trans-4-ethylcyclohexylmethyloxy)-4'-chlorotolan,
4-(trans-4-propylcyclohexylmethyloxy)-4'-chlorotolan,
4-(trans-4-butylcyclohexylmethyloxy)-4'-chlorotolan,
4-(trans-4-pentylcyclohexylmethyloxy)-4'-chlorotolan, etc.

Among the tolan compounds previously exemplified, 4-(trans-4-propylcyclohexylmethyloxy)-4'-propyltolan is a liquid crystal compound having a Δn (extrapolated value) as large as about 0.26, a viscosity (extrapolated value) at 20° C. as small as about 41 cp, a broad mesomorphic temperature range and a good stability and is a liquid crystal material having various specific well balanced features.

Representative examples of preferred liquid crystal compounds used in admixture with the compound of the formula (I) used as a component of the liquid crystal composition of the present invention are 4-substituted-phenyl 4'-substituted-benzoates, 4-substituted-phenyl -substituted-cyclohexanecarboxylates, 4-substituted-biphenyl-4'-yl 4''-substituted-cyclohexanecarboxylates, 4-substituted-phenyl 4'-(4-substituted-cyclohexanecarbonyloxy)benzoates, 4-substituted-cyclohexyl 4'-(4-substituted-cyclohexyl)benzoates, 4,4'-substituted-biphenyls, 4,4'-substituted-phenylcyclohexanes, 4 4''-substituted-terphenyls, 4,4''-substitutedbiphenylylcyclohexanes, 2-(4'-substituted-phenyl) 5-substituted-pyrimidines, etc.

In order to prevent occurrence of the interference fringes on the surface of a liquid crystal display cell which causes damage to the cell appearance, it is necessary to set a product of the optical anisotropy (Δn) of a liquid crystal material filled in the cell by the cell thickness (d) μm to a specified value. In the case of practically used display cells, the value of Δn×d has been set to any one of 0.5, 1.0, 1.6 and 2.2. Since the value of Δn×d is set to a specified one, use of a liquid crystal material having a larger Δn value can make the d value smaller. On the other hand, a smaller d value can make the response time shorter. Thus, a liquid crystal material having a larger Δn value is important for preparing a liquid crystal display cell having a higher response rate and no interference fringe. Further, in order to reduce the response time, it is also necessary to reduce the viscosity of the material. The compound of the formula (I) of the present invention is a novel nematic liquid crystal compound having a large Δn, a high N-I transition point and a low viscosity. Thus, when the compound of the formula (I) of the present invention is mixed with various other liquid crystals, it is possible to prepare a practical liquid crystal material having a large Δn, a high N-I transition point and a low viscosity.

The present invention will be described in more detail by way of examples, but it should not be construed to be limited thereto. The symbols in the Examples have the following meanings:

C-N point: crystalline-nematic phase transition point,
C-S point: crystalline-smectic phase transition point,
S-N point: smectic-nematic phase transition point,
N-I point: nematic-isotropic liquid phase transition point.

Example 1

Preparation of 4-(trans-4-propylcyclohexylmethyloxy)-4'-propyltolan

Anhydrous aluminum chloride (16.0 g, 0.12 mol) was added to carbon disulfide (100 ml), followed by dropwise addition of a mixture of 4-propylphenylacetyl chloride (19.6 g, 0.1 mol), and trans-4-propylcyclohexylmethyloxybenzene (23.2 g, 0.1 mol) under cooling at 5° C. for 20 minutes, then agitating the reaction mixture at room temperature for 10 hours, distilling off carbon disulfide, adding the residue to a dilute aqueous solution of hydrochloric acid to decompose an aluminum chloride complex, extracting deposited raw crystals with toluene (50 ml), washing the resulting toluene solution with NaOH aqueous solution, further washing with water until the washing water became neutral, drying the solution over anhydrous sodium sulfate, distilling off toluene and recrystallizing the solid residue from ethyl acetate to obtain the following compound (28.6 g):

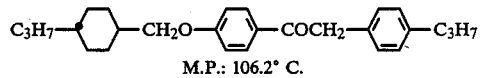

M.P.: 106.2° C.

This compound (20 g) was dissolved in anhydrous tetrahydrofuran (150 ml), followed by dropwise adding the solution into a mixed solution of lithium aluminum hydride (1.42 g) with anhydrous tetrahydrofuran (50 ml), further agitating the resulting mixture at 0° C. for 2 hours, adding 20% sulfuric acid (50 ml) to the reaction mixture to dissolve the resulting inorganic material therein, extracting the separated precipitates with toluene (100 ml), washing the toluene solution with 10% NaHCO₃ aqueous solution, washing with water until the wash water became neutral, drying the toluene solution over anhydrous sodium sulfate, distilling off toluene and recrystallizing the residual solids from ethyl acetate to obtain a compound of the following formula (15.8 g).

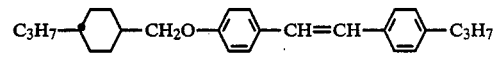

This product exhibited liquid crystal phases as follows:
C-S point: 148.9° C.,
S-N point: 177.8° C.,
N-I point: 209.7° C.

This compound was dissolved in methylene chloride (150 ml), followed by adding bromine (6.7 g, 0.042 mol) at room temperature, reacting the mixture with stirring for one hour, distilling off methylene chloride from the reaction mixture and recrystallizing the remaining solids from benzene to obtain the following compound (14.4 g):

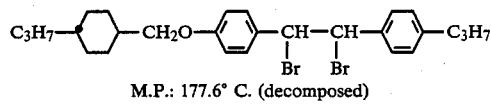

M.P.: 177.6° C. (decomposed)

This compound was then dissolved in anhydrous tetrahydrofuran (100 ml), followed by adding potassium tertiary-butoxide (8.9 g, 0.081 mol) to the solution, agitating the mixture at 40° C. for 2 hours, adding water (400 ml) to the reaction mixture, extracting the separated organic layer with toluene (50 ml), water-washing, drying, distilling off toluene and recrystallizing the remaining solids from ethyl acetate to obtain the following objective compound (6.5 g):

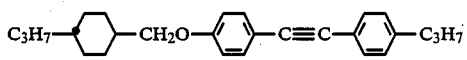

This product exhibited liquid crystal phases as follows:
C-S point: 148.2° C.,
S-N point: 179.4° C.,
N-I point: 210.3° C.

EXAMPLES 2–7

In the same manner as in Example 1, the following tolan derivatives were obtained:

4-(trans-4-ethylcyclohexylmethyloxy)-4'-ethyltolan:
C-N point: 120.3° C., N-I point: 163.7° C.

4-(trans-4-ethylcyclohexylmethyloxy)-4'-propyltolan:
C-S point: 153.6° C., S-N point: 155.8° C., N-I point: 196.1° C., 4-(trans-4-butylcyclohexylmethyloxy)-4'-ethyltolan:
C-S point: 136.8° C., S-N point: 178.7° C., N-I point: 203.0° C., 4-(trans-4-butylcyclohexylmethyloxy)-4'-propyltolan:
C-S point: 150.9° C., S-N point: 167.5° C., N-I point: 198.0° C., 4-(trans-4-propylcyclohexylmethyloxy)-4'-fluorotolan:
C-N point: 146.1° C., S-N point: 142.1° C. (monotropic), N-I point: 194.3° C., and 4-(trans-4-butylcyclohexylmethyloxy)-4'-chlorotolan:
C-S point: 144.6° C., S-N point: 184.8° C., N-I point: 216.8° C.

EXAMPLE 8

A liquid crystal composition consisting of trans-4-propyl-(4-cyanophenyl)cyclohexane: 30 wt. %,
trans-4-pentyl-(4-cyanophenyl)cyclohexane: 40 wt. % and
trans-4-heptyl-(4-cyanophenyl)cyclohexane: 30% wt. % has an N-I point of 52.1° C., a viscosity at 20° C. of 22.4 cp and an optical anisotropy value $\Delta n$ of 0.119. A liquid crystal composition obtained by adding 4-(trans-4-propylcyclohexylmethyloxy)-4'-propyltolan (15 parts by weight) shown in Example 1 to the above liquid crystal composition (85 parts by weight) had an N-I point raised to 65.7° C., a viscosity at 20° C. slightly raised to 25.2 cp and an optical anisotropy value $\Delta n$ raised to 0.159.

As apparent from this Example, the compound of the formula (I) of the present invention has an effectiveness of raising the N-I point of the mother liquid crystal composition to sufficient value while suppressing increase in the viscosity to a minimum and also raising the $\Delta n$ thereof.

What we claim is:

1. A 4-(trans-4-alkylcyclohexylmethyloxy)-4'-substituted-tolan expressed by the formula

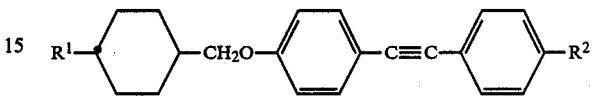

wherein $R^1$ represents an alkyl group of 1 to 10 carbon atoms and $R^2$ represents an alkyl group of 1 to 10 carbon atoms or a halogen atom of F or Cl.

2. A 4-(trans-4-alkycyclohexylmethyloxy)-4'-substituted-tolan according to claim 1 wherein $R^2$ is an alkyl group having 1 to 10 carbon atoms.

3. A 4-(trans-4-alkylcyclohexylmethyloxy)-4'-substituted-tolan according to claim 1 wherein $R^2$ is a fluorine or chlorine atom.

4. A 4-(trans-4-alkycyclohexylmethyloxy)-4'-substituted-tolan according to claim 1 wherein said $R^1$ and said $R^2$ are each independently, an ethyl, propyl or butyl group.

5. A liquid crystal mixture comprising at least two components at least one of which is a 4-(trans-4-alkylcyclohexylmethyloxy)-4'-substituted-tolan as set forth in claim 1.

* * * * *